(12) United States Patent
Asai et al.

(10) Patent No.: US 11,502,526 B2
(45) Date of Patent: Nov. 15, 2022

(54) BATTERY CHARGER CAPABLE OF HOLDING BATTERY AT ITS CHARGING POSTURE AND RETRACTED POSTURE

(71) Applicant: BROTHER KOGYO KABUSHIKI KAISHA, Nagoya (JP)

(72) Inventors: Sho Asai, Ama (JP); Atsuo Hirose, Nagoya (JP); Yuki Nagashima, Toyokawa (JP); Ryuichi Kanda, Nagoya (JP); Hitoshi Sanada, Nagoya (JP); Yusuke Ikemoto, Nagoya (JP); Shotaro Watanabe, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 901 days.

(21) Appl. No.: 16/289,606

(22) Filed: Feb. 28, 2019

(65) Prior Publication Data
US 2019/0334359 A1   Oct. 31, 2019

(30) Foreign Application Priority Data

Apr. 26, 2018   (JP) .............................. JP2018-085281

(51) Int. Cl.
*H02J 7/00* (2006.01)
*H01R 13/60* (2006.01)
(Continued)

(52) U.S. Cl.
CPC ............ *H02J 7/0045* (2013.01); *H01R 13/60* (2013.01); *H01R 33/72* (2013.01); *H02J 7/0042* (2013.01);
(Continued)

(58) Field of Classification Search
CPC ...... H02J 7/0045; H02J 7/0047; H02J 7/0042; H01R 13/60; H01R 13/73; H01R 13/2442; H01R 33/72
(Continued)

(56) References Cited

U.S. PATENT DOCUMENTS

| 5,656,914 A * | 8/1997 | Nagele ................. H02J 7/0042 320/113 |
| 8,752,922 B2 | 6/2014 | Lamontagne et al. |

(Continued)

FOREIGN PATENT DOCUMENTS

| JP | 2001-155785 A | 6/2001 |
| JP | 2009-206864 A | 9/2009 |
| JP | 2017-73838 A | 4/2017 |

OTHER PUBLICATIONS

Japanese Office Action for the related Japanese Patent Application No. 2018-085281 dated Feb. 1, 2022.

*Primary Examiner* — Edward Tso
*Assistant Examiner* — Aaron Piggush
(74) *Attorney, Agent, or Firm* — Kenealy Vaidya LLP

(57) ABSTRACT

There is provided a battery charger configured to charge a battery including a battery terminal. The battery charger includes a receiving portion in a form of a recess, and a charging terminal provided in the receiving portion. The battery is attachable to and detachable from the receiving portion. The receiving portion includes a holding portion configured to selectively hold the battery in the receiving portion at one of a first posture and a second posture different from the first posture. When the battery is in the first posture, the battery terminal is in contact with the charging terminal to allow the battery to be charged. When the battery is in the second posture, the battery terminal is separated from the charging terminal.

10 Claims, 9 Drawing Sheets

(51) Int. Cl.
*H01R 33/72* (2006.01)
*H01R 13/73* (2006.01)
*H01R 13/24* (2006.01)

(52) U.S. Cl.
CPC ........ *H02J 7/0047* (2013.01); *H01R 13/2442* (2013.01); *H01R 13/73* (2013.01)

(58) Field of Classification Search
USPC .......................... 320/107, 112, 113, 114, 115
See application file for complete search history.

(56) References Cited

U.S. PATENT DOCUMENTS

| | | | |
|---|---|---|---|
| 2010/0090645 A1* | 4/2010 | Huang .................. | H02J 7/0045 320/110 |
| 2012/0161706 A1* | 6/2012 | Zhou ..................... | G06F 1/1632 320/115 |
| 2014/0111143 A1* | 4/2014 | Sells ..................... | H02J 7/0045 320/107 |
| 2016/0094070 A1* | 3/2016 | Mazzone ................ | H02J 7/025 320/115 |

\* cited by examiner

BATTERY CHARGER CAPABLE OF HOLDING BATTERY AT ITS CHARGING POSTURE AND RETRACTED POSTURE

CROSS REFERENCE TO RELATED APPLICATION

This application claims priority from Japanese Patent Application No. 2018-085281 filed Apr. 26, 2018. The entire content of the priority application is incorporated herein by reference.

TECHNICAL FIELD

The present disclosure relates to a battery charger.

BACKGROUND

Japanese Patent Application Publication No. 2001-155785 discloses a battery charger capable of preventing a battery from falling from the charger. The battery charger includes a recessed portion for receiving the battery therein, and a pair of protruding portions each positioned at each end of the recessed portion. Each protruding portion configured to be fitted with a groove formed in a case of the battery. The recessed portion has a bottom surface formed with a stepped portion. The stepped portion is positioned adjacent to the protruding portions and a fulcrum for pivotal movement of the battery is positioned in the vicinity of the protruding portions.

The disclosed positional relationship between the fulcrum and the protruding portion restrains the groove of the battery from disengaging from the protruding portion. Thus, the pivotal motion of the battery relative to the charger is restrained. Accordingly, falling the battery from the battery charger due to the pivotal movement of the battery can be prevented.

SUMMARY

However, for attaching the battery to the disclosed battery charger, positional adjustment between the groove of the battery and the protruding portion of the battery charger is required. Therefore, attaching operation of the battery to the above charger may pose difficulties for a user.

In view of the foregoing, it is an object of the disclosure to provide a battery charger capable of preventing a battery from falling without lowering operability for attaching the battery to the charger.

In order to attain the above and other objects, according to one aspect, there is provided a battery charger configured to charge a battery including a battery terminal. The battery charger includes a receiving portion in a form of a recess, and a charging terminal provided in the receiving portion. The battery is attachable to and detachable from the receiving portion. The receiving portion includes a holding portion configured to selectively hold the battery in the receiving portion at one of a first posture and a second posture different from the first posture. When the battery is in the first posture, the battery terminal is in contact with the charging terminal to allow the battery to be charged. When the battery is in the second posture, the battery terminal is separated from the charging terminal.

Note that, positional relationships, directions, and the like referenced in the present disclosure, such as parallel, perpendicular, and opposite, are not to be limited to the strict meanings of parallel, perpendicular, and opposite, but may include the meanings of generally parallel, generally perpendicular, and generally opposite.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

<Overview of the Battery Charger 1A>

A battery charger 1A according to one embodiment of the disclosure will be described with reference to FIGS. 1 through 13.

The battery charger 1A is configured to charge a battery 9. The battery 9 is attachable to and detachable from a receiving portion 7 of the battery charger 1A. Charging to the battery 9 is performed in a state where the battery 9 is attached to the receiving portion 7. The charged battery 9 is attached to a printing device (not illustrated) for driving the printing device.

The battery charger 1A can be used in its horizontal posture or its vertical posture. The horizontal posture is a posture defined when the battery charger 1A is placed on a horizontal plane such as a top surface of a desk. The vertical posture is a posture defined when the battery charger 1A is mounted on a vertical surface such as a wall. The battery charger 1A can hold the battery 9 not only in the horizontal posture but also in the vertical posture.

Further, the battery charger 1A can hold the battery 9 with its charging posture and retracted posture. In a state where the battery 9 is at the charging posture, terminals of the battery 9 (battery terminals 90 described later) are connected to terminals of the battery charger 1A (charging terminals 40 described later) so that the battery 9 can be charged by the battery charger 1A. In a state where the battery 9 is at its retracted posture, the battery terminals 90 of the battery 9 are separated away from the charging terminals 40 of the battery charger 1A.

In the following description, directions with respect to the battery charger 1A will be referenced based on arrows shown in FIG. 1. Specifically, lower-right, upper left, upper-right, lower-left, upward, downward of FIG. 1 correspond to frontward, rearward, rightward, leftward, upward and downward directions of the battery charger 1A. These directions with respect to the battery charger 1A will be referred to herein assuming that the battery charger 1A is in its horizontal posture.

<Housing 10>

Figure 1:
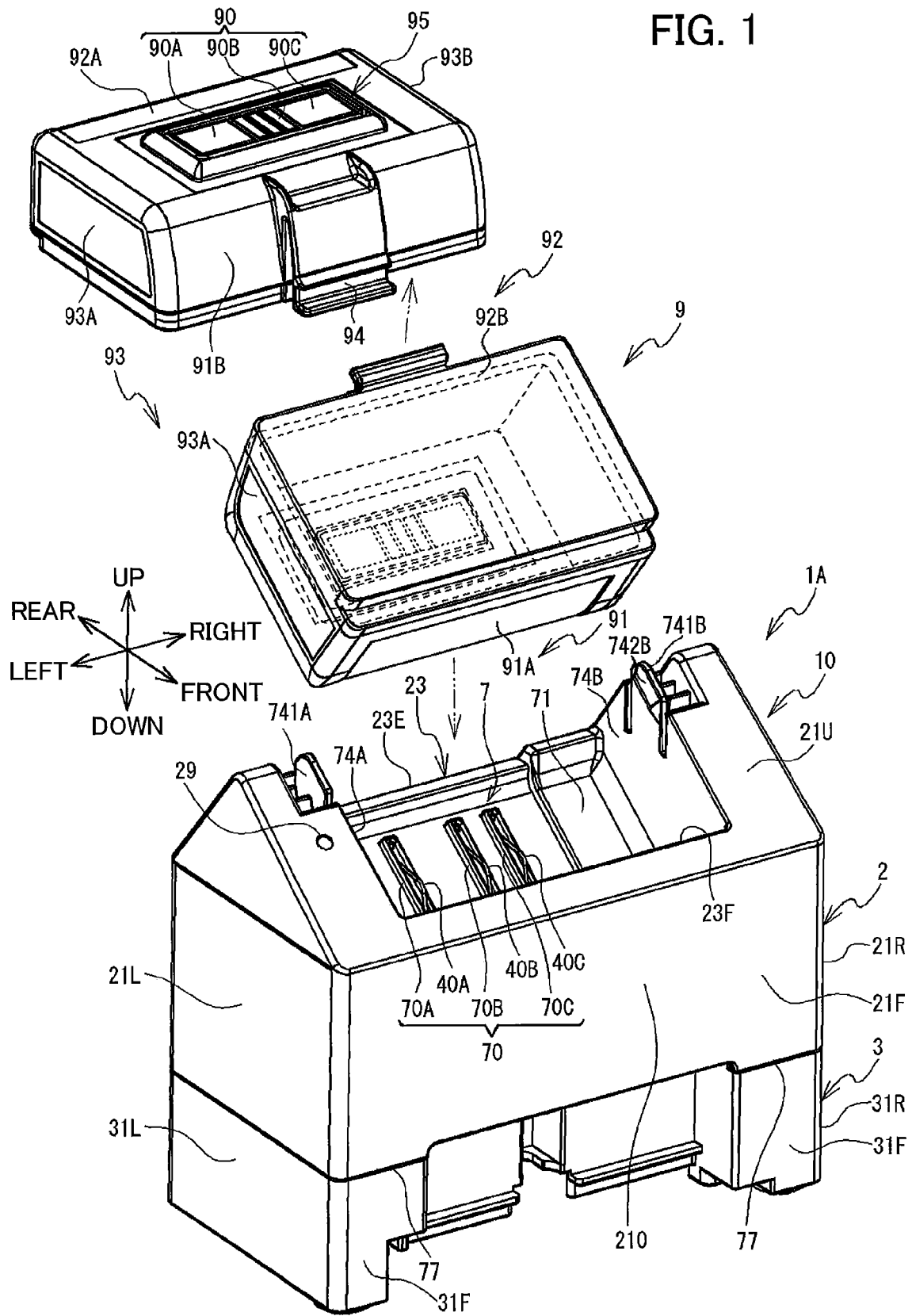
FIG. 1 is a perspective view of a battery and a battery charger according to one embodiment.

As illustrated in FIG. 1, the battery charger 1A includes a housing 10. The housing 10 includes a first cover 2 and a second cover 3. Specifically, the first cover 2 and the second cover 3 constitute an upper portion and a lower portion of the casing 2, respectively.

Figure 2:
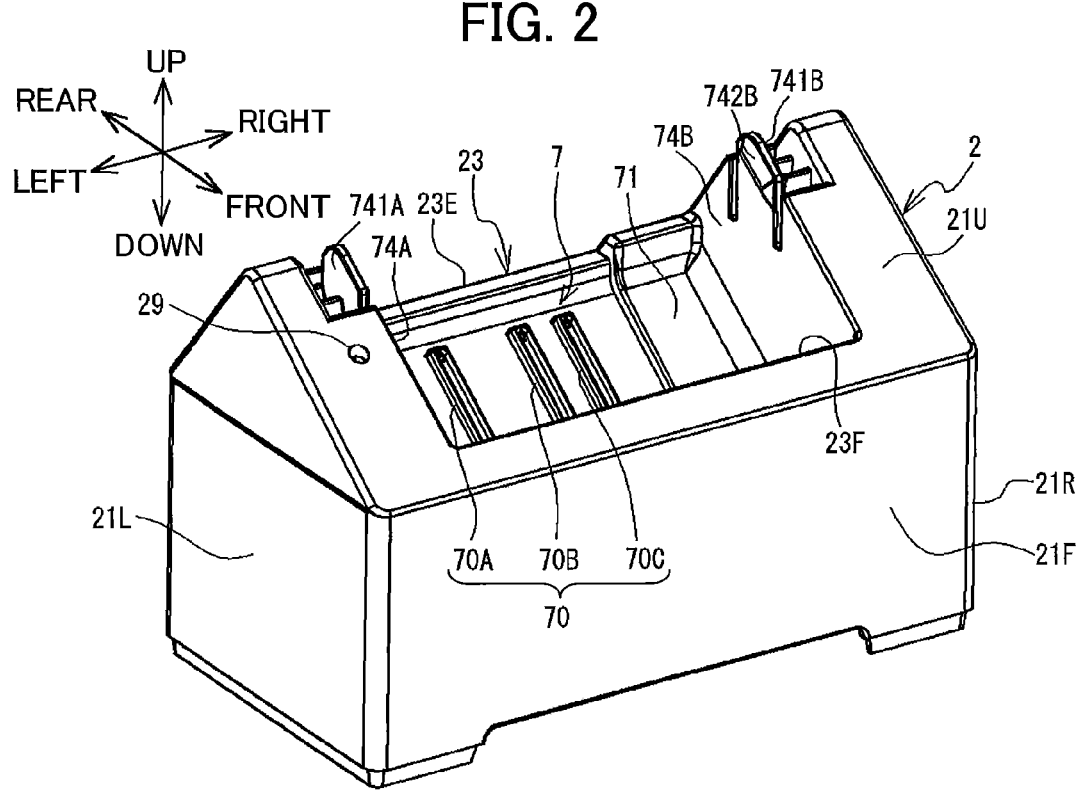
FIG. 2 is a perspective view of a first cover of the battery charger according to the embodiment.
Figure 3:
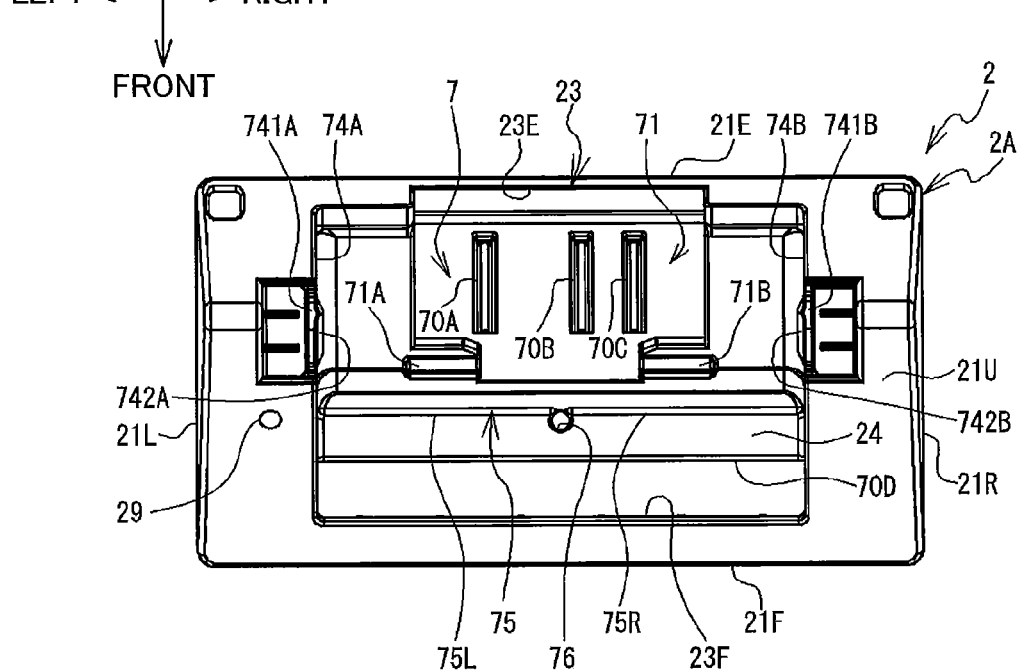
FIG. 3 is a plan view of the first cover of the battery charger according to the embodiment.
Figure 4:
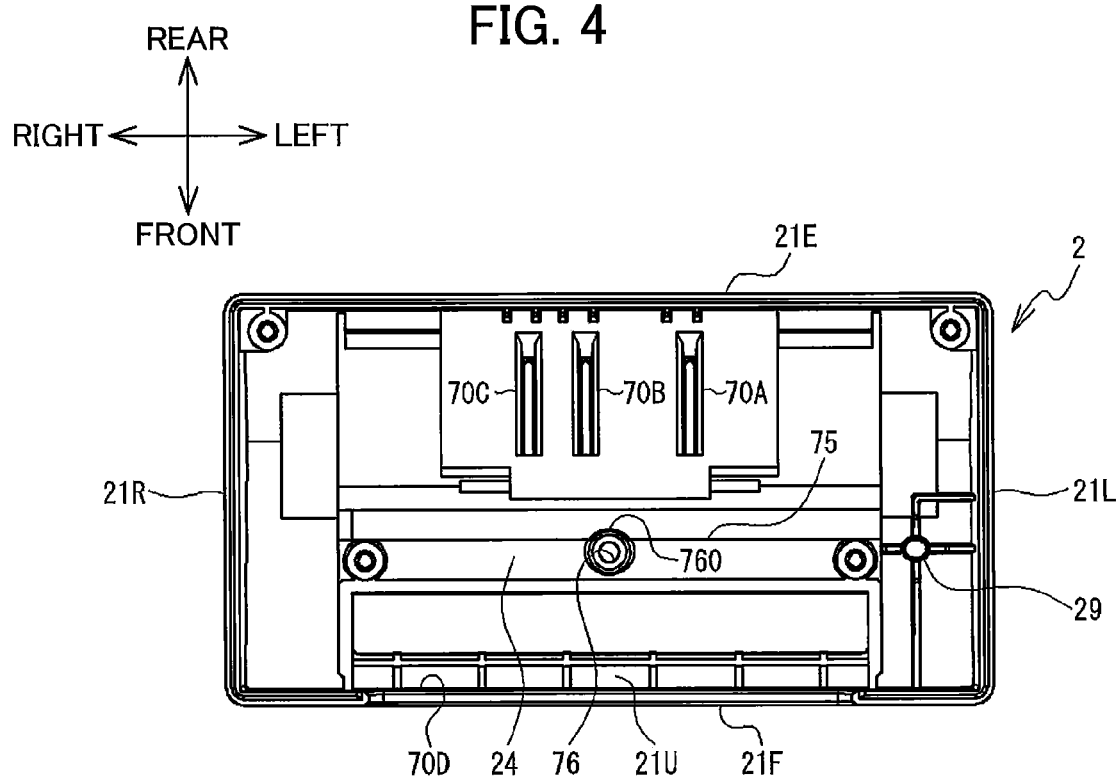
FIG. 4 is a bottom view of the first cover of the battery charger according to the embodiment

As illustrated in FIGS. 2 through 4, the first cover 2 includes walls 21F, 21E (see FIGS. 3 and 4), 21L, 21R, and 21U (see FIG. 2). These walls 21F, 21E, 21L, 21R, and 21U constitute a front end portion, a rear end portion, a left end portion, a right end portion, and an upper end portion of the first cover 2, respectively. The walls 21F and 21E extend perpendicularly to a front-rear direction. The walls 21L and 21R extend perpendicularly to a left-right direction. The wall 21U includes a portion sloping diagonally downward from a front-rear center thereof toward the front end portion (i.e., the wall 21F), and another portion sloping diagonally downward from the front-rear center to the rear end portion (i.e., the wall 21E).

The wall 21U is formed with an opening portion 23 that is open upward. As illustrated in FIG. 3, the opening portion 23 has a rectangular shape elongated in the left-right direction as viewed from above. Of four sides defining the opening portion 23, a pair of sides 23F, 23E opposing each other in the front-rear direction extend in the left-right direction. The side 23F is positioned adjacent to the wall 21F, and the side 23E is positioned adjacent to the wall 21E. The opening portion 23 constitutes an upper end portion of the receiving portion 7.

Further, a through-hole 29 having a circular shape is formed in the wall 21U at a position leftward relative to the opening portion 23. A tip end portion of an LED light pipe 49 (see FIG. 8, described later) extends through the through-hole 29.

As illustrated in FIGS. 3 and 4, a rectangular-shaped through-hole 70D is formed in the receiving portion 7 of the first cover 2. The through-hole 70D is elongated in the left-right direction. As illustrated in FIG. 4, of four sides defining the through-hole 70D, a pair of sides opposing each other in the front-rear direction extend in the left-right direction. Of the pair of sides, the frontward side is defined by the wall 21F, and the rearward side is defined by a front end of a sloped portion 24 (described later) of the first cover 2.

Figure 5:
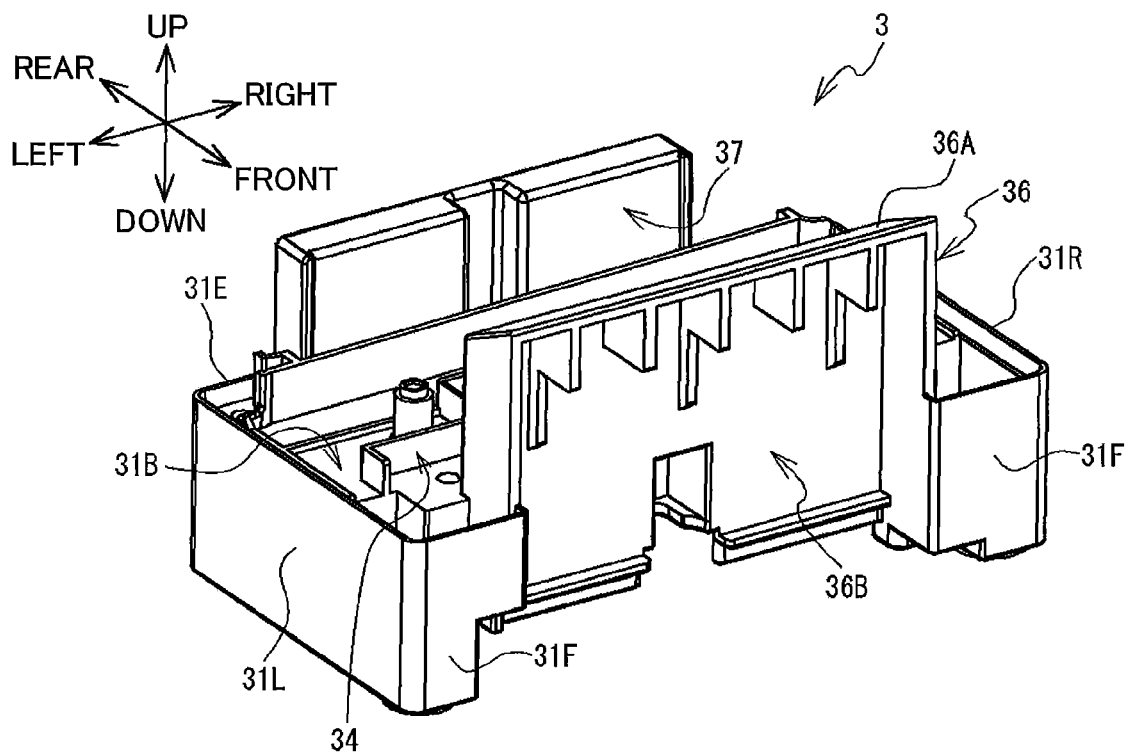
FIG. 5 is a perspective view of a second cover of the battery charger according to the embodiment.
Figure 6:
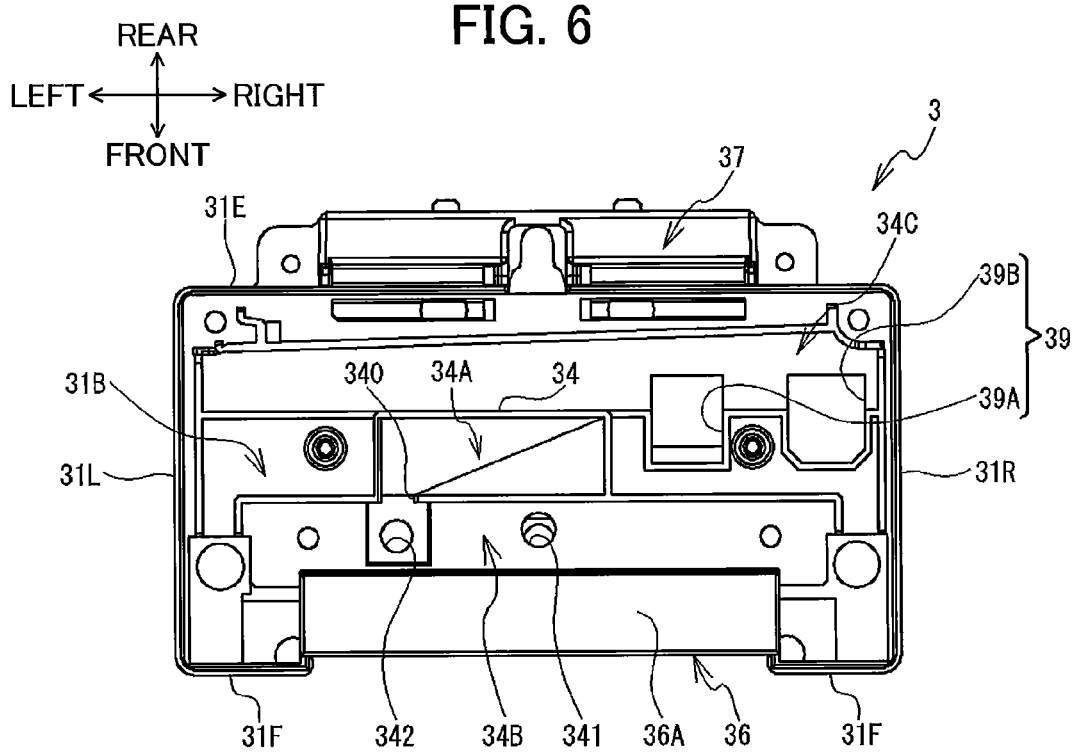
FIG. 6 is a plan view of the second cover of the battery charger according to the embodiment.
Figure 7:
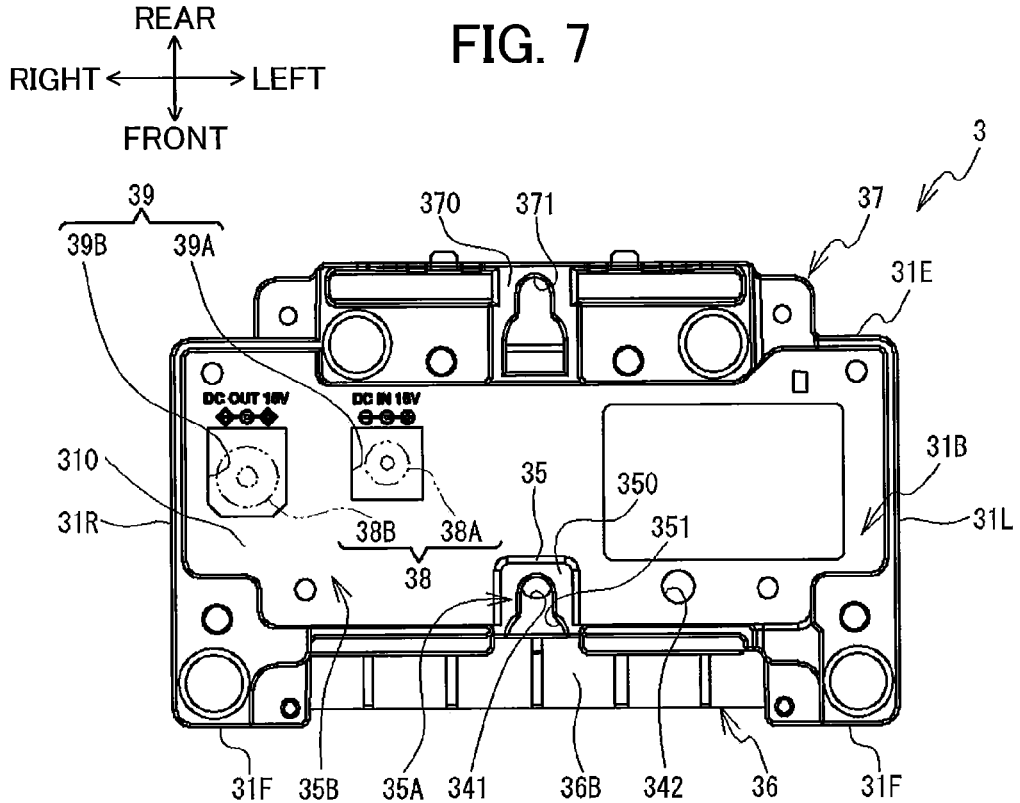
FIG. 7 is a bottom view of the second cover of the battery charger according to the embodiment.

As illustrated in FIGS. 5 through 7, the second cover 3 includes walls 31F, 31E, 31L, 31R, and 31B. These walls 31F, 31E, 31L, 31R, and 31B constitute a front end portion, a rear end portion, a left end portion, a right end portion, and a lower end portion of the second cover 3, respectively. The walls 31F and 31E are perpendicular to the front-rear direction. The walls 31L and 31R are perpendicular to the left-right direction. The wall 31B extends perpendicularly to an up-down direction, and is surrounded by the walls 31F, 31E, 31L, and 31R. These walls 31F, 31E, 31L, and 31R extend upward and downward relative to the wall 31B.

As illustrated in FIG. 6, a plate-shaped rib 34 is provided at an upper surface of the wall 31B to protrude upward therefrom. The rib 34 partitions an upper region above the wall 31B into a plurality of regions including regions 34A, 34B, and 34C. The region 34A is positioned at generally center of the upper region in the front-rear direction and in the left-right direction. The region 34B is positioned frontward of the region 34A and extends in the left-right direction.

A portion of the rib 34 partitioning the region 34A from the region 34B is partly lacking to form a lacking portion 340. The region 34A and the region 34B are in communication with each other through the lacking portion 340. The region 34B is formed with circular through-holes 341 and 342, so that the upper surface and a lower surface of the wall 31B are communicated with each other through the through-holes 341 and 342. The lower surface of the wall 31B will be referred to as a wall surface 310 (see FIG. 7), hereinafter. That is, the wall surface 310 is a surface facing outward at a lower end of the housing 10. The through-hole 341 is in communication with a hollow cylindrical portion 760 (see FIG. 4, described later) of the first cover 2 from above. The through-hole 342 is positioned frontward of the lacking portion 340. The region 34C is positioned rightward of the region 34A. In the region 34C, a connector 38 is disposed so that a power cable is connectable to the connector 38. Details of the connector 38 will be described later.

As illustrated in FIG. 7, a first extension portion 35 is provided at the wall surface 310 (lower surface) of the wall 31B. The first extension portion 35 extends downward from the wall surface 310. The first extension portion 35 is provided at a position leftward, rightward and rearward of the through-hole 341. The first extension portion 35 partitions a lower region below the wall surface 310 and surrounded by the walls 31F, 31E, 31L and 31R into a region 35A including the through-hole 341, and a region 35B that does not include the through-hole 341. In the region 35B, through-holes 39A and 39B are formed. The through-holes 39A and 39B may be collectively called as a through-hole 39. In the region 35A, a wall-latched portion 350 is provided for hanging the battery charger 1A on a vertical wall. The wall-latched portion 350 includes a recessed portion 351 that is recessed rearward. The battery charger 1A is held in its vertical posture on the vertical wall by latching a hook fixed to the wall with the recessed portion 351.

As indicated by two dotted chain lines in FIG. 7, the connector 38 includes an input connector 38A and an output connector 38B. These connectors 38A, 38B are surface-mounted on a circuit board 38C (FIG. 10) to be electrically connected thereto. The input connector 38A has a connecting end portion exposed to the region 35B on the wall surface 310 through the through-hole 39A. The output connector 38B has a connecting end portion exposed to the region 35B on the wall surface 310 through the through-hole 39B. The input connector 38A is configured to be connected to a power cable of an AC adapter (not illustrated) to supply DC power to the battery charger 1A. The output connector 38B is configured to be connected to another input connector 38A of another battery charger 1A through a power cable. In this case, the DC power outputted from the output connector 38B is supplied to the other battery charger 1A.

As illustrated in FIG. 5, the second cover 3 further includes a first engagement portion 36 and a second engagement portion 37. The first engagement portion 36 protrudes upward from a front end of the wall 31F. The second engagement portion 37 protrudes upward from a rear end of the wall 31E. The first engagement portion 36 is inserted in the through-hole 70D (FIG. 4) of the first cover 2 from below in a state where the first cover 2 and the second cover 3 are assembled to each other. The first engagement portion 36 includes a sloped portion 36A and a recessed portion 36B.

The sloped portion 36A constitutes an upper end portion of the first engagement portion 36. The sloped portion 36A is inclined diagonally downward toward a rear end thereof. The recessed portion 36B is positioned below the sloped portion 36A and is recessed rearward. The recessed portion 36B is configured to be engaged with a second engagement portion 37 of another battery charger 1A. That is, a plurality of battery chargers 1A are connectable to one another. In this case, charging to a plurality of batteries 9 can be performed by electrically connecting neighboring two of the battery chargers 1A through a power cable. Further, the second engagement portion 37 has a lower portion provided with a wall-latched portion 370 (see FIG. 7). The wall-latched portion 370 has a recessed portion 371 that is recessed rearward. The wall-latched portion 370 provides the same function as the wall-latched portion 350. That is, the wall-latched portion 370 enables the battery charger 1A to be hung on a vertical wall.

As illustrated in FIG. 1, the wall 21F of the first cover 2 and the wall 31F of the second cover 3 are flush with each other and constitute a front wall surface of the housing 10. Hereinafter, front surfaces of the walls 21F and 31F will be referred to as a wall surface 210. The wall surface 210 is a surface facing outward at a front end of the housing 10. The wall 21L of the first cover 2 is flush with the wall 31L of the second cover 3. The walls 21L and 31L constitute a left wall surface of the housing 10. The wall 21R of the first cover 2 is flush with the wall 31R of the second cover 3. The walls 21R and 31R thus constitute a right wall surface of the housing 10. The wall 21E of the first cover 2 is flush with the wall 31E of the second cover 3. The walls 21E and 31E thus constitute a rear wall surface of the housing 10. The receiving portion 7 of the first cover 2 is positioned above the wall 31B (FIG. 5) of the second cover 3.

<Circuit Board Holder 4>

Figure 8:
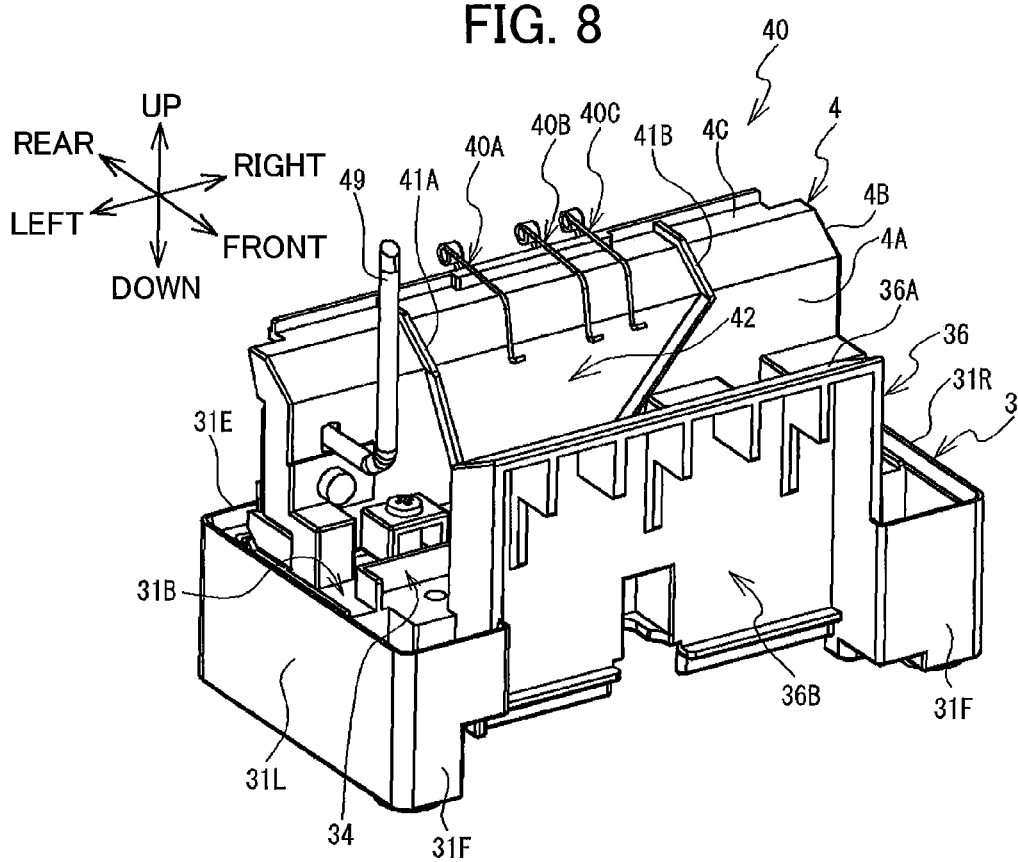
FIG. 8 is a perspective view of the second cover and a board holder of the battery charger according to the embodiment.

As illustrated in FIG. 8, a circuit board holder 4 is fixed to an upper portion of the second cover 3 at a position rearward relative to a front-rear center thereof. The circuit board holder 4 has a plate shape bent into plate portions 4A, 4B, and 4C. The plate portion 4A is perpendicular to the front-rear direction and extends upward from the wall 31B. The plate portion 4B extends diagonally upward and rearward from an upper end of the plate portion 4A. The plate portion 4C extends rearward from a rear end of the plate portion 4B. The circuit board 38C (see FIG. 10) is disposed at a position rearward of the circuit board holder 4 so as to face in the front-rear direction. A charging circuit and a control circuit, and the like (not shown) are surface-mounted on the circuit board 38C.

The LED light pipe 49 is provided at a left end portion of the plate portion 4A. The LED light pipe 49 has an inverted L-shape in a left side view, and is a transparent cylindrical rod. The LED light pipe 49 has a base end positioned frontward of an LED (not illustrated) provided at the circuit board 38C. The LED light pipe 49 is configured to transmit LED light toward the tip end portion of the pipe to illuminate the tip end portion. Emission of light from the LED is configured to be controlled by the control circuit on the circuit board 38C in order to notify a charging state of the battery 9 attached to the receiving portion 7. Further, charging terminals 40A, 40B, and 40C (collectively referred to as the charging terminals 40) are also mounted on the circuit board 38C. The charging terminals 40 are formed of bent metal wires having flexibility. The charging terminals 40 are adapted to make contact with the battery terminals 90 (FIG. 1) of the battery 9 attached to the receiving portion 7.

Guide ribs 41A and 41B are provided over the circuit board holder 4. The guide ribs 41A and 41B extend along the plate portions 4A, 4B and 4C, while bending, in a direction from an upper end portion toward a lower end portion of the circuit board holder 4. The guide ribs 41A and 41B are spaced away from each other in the left-right direction to provide a guide path 42 therebetween. The guide path 42 has a distance in the left-right direction that becomes smaller toward downward (toward the lower end portion of the circuit board holder 4). The guide path 42 has a lower end portion that is positioned above the region 34A (FIG. 5) in the second cover 3.

<Receiving Portion 7>

As illustrated in FIG. 1, the receiving portion 7 is provided as a recess that is recessed downward. The receiving portion 7 has an upper end that is open upward through the opening portion 23. That is, the opening portion 23 is an open end of the recess defining the receiving portion 7.

Figure 9:
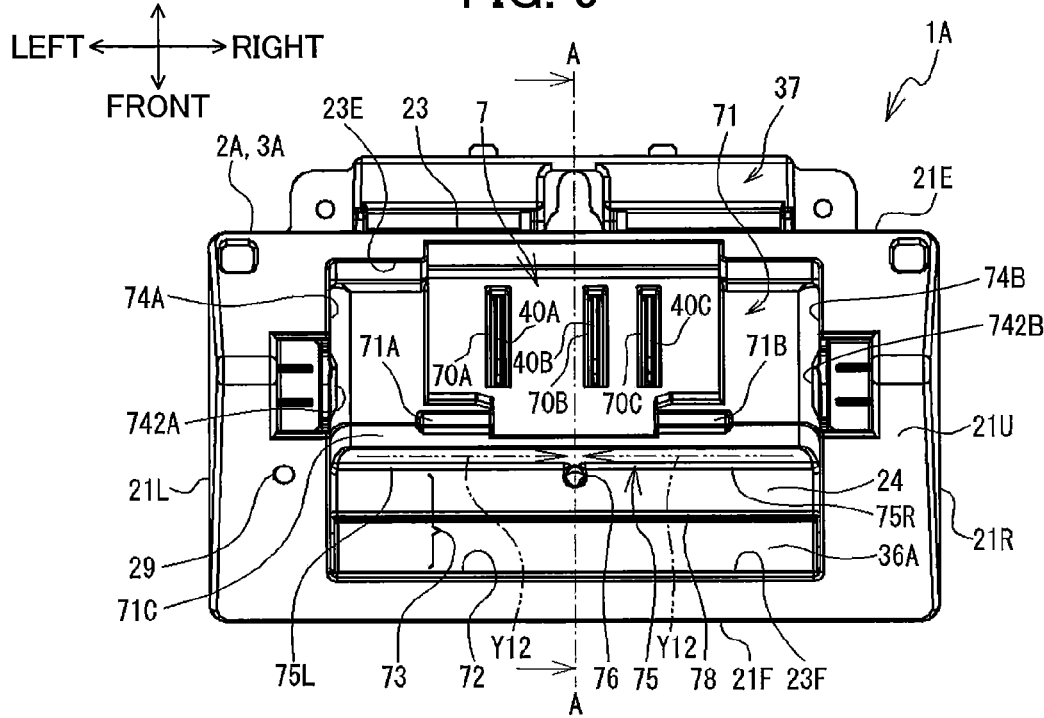
FIG. 9 is a plan view of the battery charger according to the embodiment.
Figure 10:
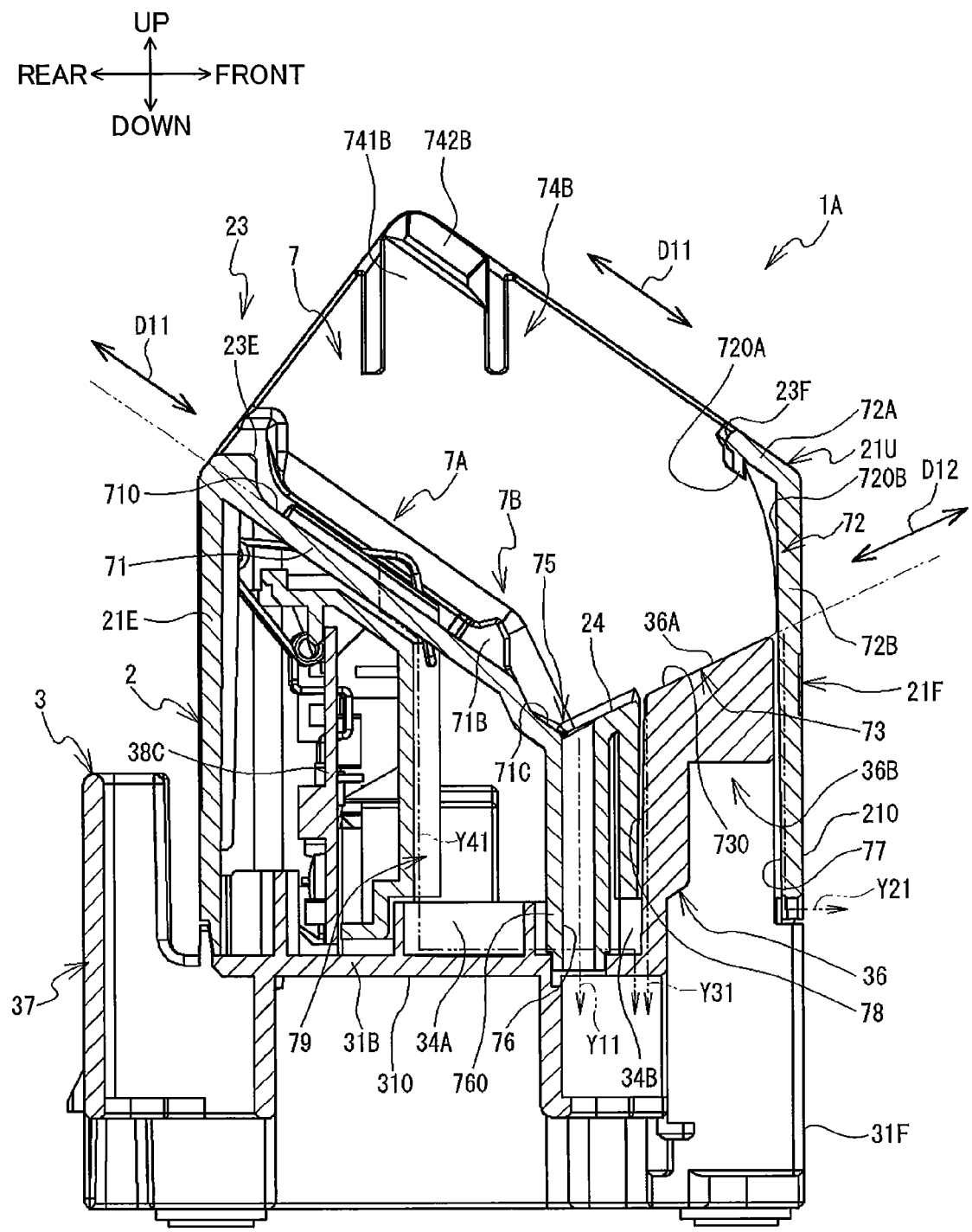
FIG. 10 is a cross-sectional view of the battery charger according to the embodiment taken along a line A-A in FIG. 9.

As illustrated in FIGS. 1, 9 and 10, the receiving portion 7 is defined by a first plate portion 71, a second plate portion 72 (see FIG. 10), a third plate portion 73 (see FIGS. 9 and 10), and side plate portions 74A and 74B (see FIGS. 1 and 9).

As illustrated in FIGS. 1 and 10, the first plate portion 71 is a part of the first cover 2. As illustrated in FIG. 10, the first plate portion 71 extends diagonally downward and frontward from the side 23E of the opening portion 23. The first plate portion 71 has an upper surface (hereinafter simply referred to as a sloped surface 710) sloping diagonally downward toward the front from the side 23E of the opening portion 23. This sloping direction of the sloped surface 710 will be referred to as a sloping direction D11 (indicated by an arrow in FIG. 10). In other words, the sloping direction D11 is a direction away from the opening portion 23 (downward) in the up-down direction and toward the side 23F (frontward) in the front-rear direction.

As illustrated in FIGS. 2 and 3, the first plate portion 71 is formed with slots 70A, 70B and 70C extending in the sloping direction D11. These slots 70A, 70B and 70C will be collectively referred to as slots 70 (see FIG. 1). As illustrated in FIG. 1, portions of the respective charging terminals 40A, 40B and 40C near tip end portions thereof are inserted through the slots 70A, 70B and 70C from below, and protrude into the receiving portion 7 from the sloped surface 710. These portions of the charging terminals 40 protruding into the receiving portion 7 through the corresponding slots 70 serve as electrical contacts of the receiving portion 7 (hereinafter, will be referred to as contact portions).

As illustrated in FIGS. 9 and 10, the first plate portion 71 further includes a pair of protruding portions 71A and 71B. The protruding portions 71A and 71B are formed on the sloped surface 710 to protrude inward of the receiving portion 7 (i.e., upward), respectively. The protruding portions 71A and 71B are positioned opposite to the opening portion 23 (side 23E) with respect to the charging terminals 40 in the sloping direction D11. As illustrated in FIG. 9, each of the protruding portions 71A and 71B extends in the left-right direction, and arranged in line in the left-right direction. The protruding portion 71A is positioned leftward of the protruding portion 71B. As illustrated in FIG. 10, the first plate portion 71 further includes a recessed portion 71C that is recessed downward. The recessed portion 71C is positioned farther away from the opening portion 23 (side 23E) than the protruding portions 71A and 71B are from the opening portion 23 (side 23E) in the sloping direction D11.

As illustrated in FIG. 10, the second plate portion 72 is constituted by a front end portion of the wall 21U and an upper end portion of the wall 21F of the first cover 2. The second plate portion 72 includes a first part 72A corresponding to the front end portion of the wall 21U, and a second part 72B corresponding to the upper end portion of the wall 21F. The first part 72A extends diagonally downward from the side 23F of the opening portion 23. The first part 72A has an inner surface (hereinafter, simply referred to as a slant surface 720A) extending in a direction parallel to the sloping direction D11 in which the sloped surface 710 of the first plate portion 71 extends. The second part 72B extends downward from a front end of the first part 72A, the front end of the first part 72A being farther from the opening portion 23 (side 23F) than a rear end of the first part is from the opening portion 23 (side 23F) in the sloping direction D11. That is, the front end of the first part 72A is opposite to the side 23F in the sloping direction D11. The second part 72B has an inner surface (hereinafter simply referred to as a wall surface 720B) extending in the up-down direction.

As illustrated in FIGS. 9 and 10, the third plate portion 73 extends between a front end portion of the first plate portion 71 and the second plate portion 72, the front end portion being farther away from the opening portion 23 (side 23E) than a rear end portion of the first plate portion 71 is from the opening portion 23 (side 23E). That is, the front end portion of the first plate portion 71 is opposite to the side 23E in the sloping direction D11. As illustrated in FIG. 10, the third plate portion 73 is constituted by the sloped portion 24 of the first cover 2, and the sloped portion 36A of the second cover 3.

The sloped portion 24 of the first cover 2 extends diagonally upward and frontward from an end portion of the recessed portion 71C, the end portion being farther away from the opening portion 23 (side 23E) than another end portion of the recessed portion 71C is from the opening portion 23 (side 23E). The sloped portions 24 and 36A are flush with each other to form an upper surface (hereinafter simply referred to as a sloped surface 730) of the third plate portion 73. The sloped surface 730 extends diagonally downward and rearward in a sloping direction D12 from a position adjacent to the wall 21F, more specifically, from a position rearward of the wall surface 720B.

The extending direction of the first plate portion 71 (sloping direction D11) and the extending direction of the third plate portion 73 (sloping direction D12) cross with each other. A rear end of the third plate portion 73 (the end farthest from the wall 21F) is connected to a front end of the recessed portion 71C, the front end being farther from the opening portion 23 (side 23F) than a rear end of the recessed portion 71C is from the opening portion 23 (side 23F). The sloped surface 710 of the first plate portion 71 and the sloped surface 730 of the third plate portion 73 are connected to each other at their lower ends. Hereinafter, the portion at which the sloped surfaces 710 and 730 are connected to each other will be referred to as a connecting portion 75.

As illustrated in FIG. 9, the connecting portion 75 extends in the left-right direction. Specifically, the connecting portion 75 has a left half portion 75L and a right half portion 75R. The left half portion 75L is inclined gradually downward toward a left-right center of the connecting portion 75 from a left end thereof. The right half portion 75R is inclined gradually downward toward the left-right center of the connecting portion 75 from a right end thereof.

As illustrated in FIGS. 1 through 3, the side plate portions 74A and 74B are perpendicular to the left-right direction, and oppose each other in the left-right direction. The side plate portion 74A is positioned leftward of the side plate portion 74B. The side plate portions 74A and 74B define a left end and a right end of the receiving portion 7, respectively.

The side plate portion 74A has an upper end portion provided with a plate-shaped holding pawl 741A extending upward. The side plate portion 74B has an upper end portion provided with a plate-shaped holding pawl 741B extending upward. Each of upper end portions of the holding pawl 741A and holding pawl 741B is resiliently deformable in the left-right direction. The upper end portion of the holding pawl 741A has a right side surface provided with a pawl portion 742A (see FIG. 3) protruding rightward. The upper end portion of the holding pawl 741B has a left side surface provided with a pawl portion 742B (see FIGS. 2 and 3) protruding leftward.

In the following description, the protruding portions 71A and 71B, the second plate portion 72, the third plate portion 73, and the holding pawls 741A and 741B will be referred collectively as a holding portion 7A (see FIG. 10); and the sloped surfaces 710 and 730 will be collectively referred to as a bottom support portion 7B (see FIG. 10).

<First Exhaust Passage 76>

The battery charger 1A is provided with first through fourth exhaust passages 76 through 79 for discharging liquid such as drinking water that may inadvertently enter the receiving portion 7 by user's accidental spilling of the liquid thereon. The first through fourth exhaust passages 76 through 79 will be described in detail in this order.

The first exhaust passage 76 provides communication between the wall surface 310 of the wall 31B and the receiving portion 7 in the housing 10. As illustrated in FIGS. 4 and 10, the first exhaust passage 76 is provided by a through-hole of the hollow cylindrical portion 760 extending downward from the connecting portion 75 of the first cover 2. The hollow cylindrical portion 760 extends through the through-hole 341 (FIG. 6) of the wall 31B of the second cover 3, and extends to the wall surface 310 (FIG. 7). The first exhaust passage 76 is positioned at a radially center portion of the hollow cylindrical portion 760 and extends in the up-down direction.

As illustrated in FIG. 9, the first exhaust passage 76 has an upper end that is open at a center of the connecting portion 75 in the left-right direction. As illustrated in FIG. 10, the first exhaust passage 76 has a lower end that is open at the wall surface 310 of the wall 31B of the second cover 3. That is, the first exhaust passage 76 extends downward from the left-right center of the connecting portion 76 in the receiving portion 7 and is communicated with the wall surface 310 of the wall 31B of the second cover 3. The first exhaust passage 76 is configured to discharge liquid entered into the receiving portion 7 as indicated by an arrow Y11 in FIG. 10.

<Second Exhaust Passage 77>

The second exhaust passage 77 provides communication between the wall surface 210 of the wall 21F and the receiving portion 7 in the housing 10. As illustrated in FIG. 10, the second exhaust passage 77 is a gap defined between the wall 21F of the first cover 2 and the first engagement portion 36 of the second cover 3. The second exhaust passage 77 is in communication with the receiving portion 7 at an open end (hereinafter simply referred to as a proximal portion) defined between the wall surface 720B of the second part 72B of the second plate portion 72 corresponding to the wall 21F and a front end of the sloped portion 36A of the first engagement portion 36, the front end being closer to the second part 72B than a rear end of the sloped portion 36A is to the second part 72B.

The second exhaust passage 77 extends downward along the wall surface 720B from the proximal portion, and is bent frontward to extend frontward and is communicated with a generally center portion in the up-down direction of the wall surface 210 of the walls 21F, 31F. The second exhaust passage 77 is configured to discharge liquid entered into the receiving portion 7 as indicated by an arrow Y21 in FIG. 10.

<Third Exhaust Passage 78>

The third exhaust passage 78 provides communication between the wall surface 310 of the wall 31B and the receiving portion 7 in the housing 10. The third exhaust passage 78 is provided by a gap (FIG. 10) between the sloped portion 24 of the first cover 2 and the first engagement portion 36 of the second cover 3, the region 34B (FIGS. 6 and 10) of the second cover 3, and the through-hole 342 (FIGS. 6 and 7) of the second cover 3.

As illustrated in FIG. 10, the third exhaust passage 78 has an upper end in communication with the sloped surface 730 at a position higher than the upper end of the first exhaust passage 76. As illustrated in FIG. 9, the upper end of the third exhaust passage 78 extends linearly in the left-right direction. As illustrated in FIG. 10, the third exhaust passage 78 includes a gap extending in the up-down direction between a lower portion of the sloped portion 24 of the first cover 2 and the first engagement portion 36 of the second cover 3, and communicating with the region 34B of the second cover 3. As illustrated in FIGS. 6 and 7, the third exhaust passage 78 further extends downward from the region 34B through the through-hole 342, and is open on the wall surface 310 of the wall 31 to be in communication therewith. The third exhaust passage 78 is configured to discharge liquid entered into the receiving portion 7 as indicated by an arrow Y31 in FIG. 10.

<Fourth Exhaust Passage 79>

The fourth exhaust passage 79 provides communication between the wall surface 310 of the wall 31B and the receiving portion 7 in the housing 10. The fourth exhaust passage 78 is provided by the through-holes 70 (FIG. 1) of the first plate portion 71, the guide path 42 (FIG. 8) of the circuit board holder 4, the regions 34A and 34B (FIG. 6) of the second cover 3, and the through-hole 342 (FIGS. 6 and 7) of the second cover 3. The fourth exhaust passage 79 has an upper end in communication with the sloped surface 710 (FIG. 10) of the first plate portion 71 through the through-holes 70. The fourth discharge passage 79 extends downward along the guide path 42 from the through-holes 70, and is communicated with the regions 34A and 34B (FIG. 6) of the second cover 3. The fourth exhaust passage 79 further extends through the regions 34A and 34B and is communicated with the wall surface 310 of the wall 31B through the through-hole 342. The fourth exhaust passage 79 is configured to discharge liquid entered into the receiving portion 7 as indicated by an arrow Y41 in FIG. 10.

<Battery 9>

As illustrated in FIG. 1, the battery 9 has a generally rectangular parallelepiped shape. The battery 9 has a pair of first side surfaces 91 (first side surfaces 91A and 91B) facing each other, a pair of second side surfaces 92 (second side surfaces 92A and 92B) facing each other, and a pair of third side surfaces 93 (third side surfaces 93A and 93B) facing each other. The second side surface 92A has a center portion provided with a projection portion 95 at which battery terminals 90A, 90B and 90C (will be referred collectively to as the battery terminals 90) are provided. The battery terminals 90 are plate shaped and made from metal. The first side surface 91B is provided with a hand grip 94 having a plate-like shape.

<Holding Modes of the Battery 9>

Figure 11:
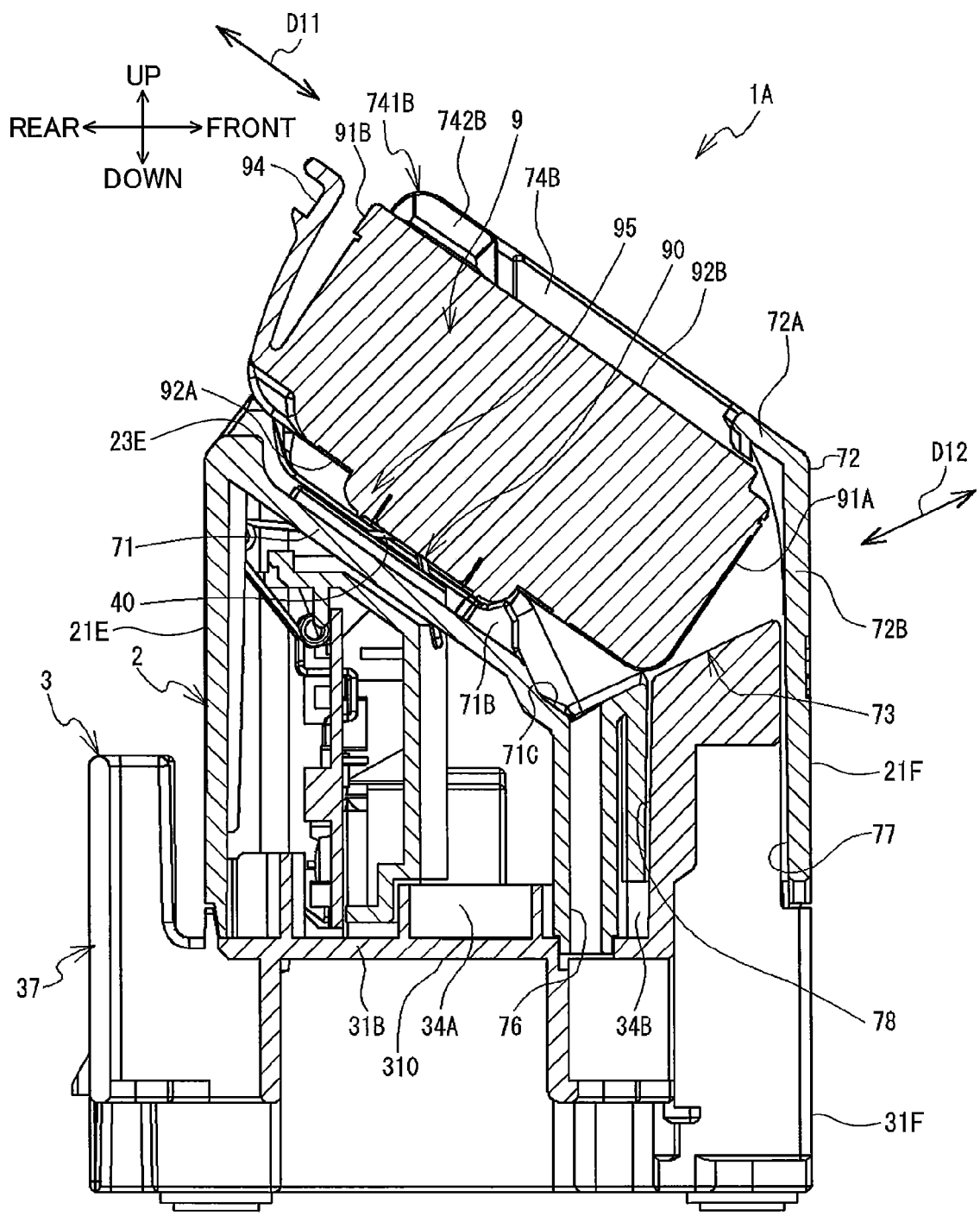
FIG. 11 is a cross-sectional view of the battery charger according to the embodiment and illustrating a state where the battery is held at its charging posture.

FIG. 11 illustrates a state where the battery 9 is attached to the battery charger 1A in the charging posture. That is, the battery 9 is configured to be charged in the posture illustrated in FIG. 11. In the charging posture of the battery 9, the pair of second side surfaces 92 is oriented in parallel to the first plate portion 71 and the first part 72A of the second plate portion 72 of the receiving portion 7. The second side surface 92A is positioned above and faces the first plate portion 71. The projection portion 95 at the second side surface 92A is in abutment with the protruding portions 71A and 71B of the first plate portion 71 from above. The battery terminals 90 provided at the projection portion 95 are in contact with the contact portions of the charging terminals 40 provided at the first plate portion 71. The second side surface 92B of the battery 9 is exposed to the outside through the opening portion 23 of the receiving portion 7.

In the charging posture of the battery 9, the pair of third side surfaces 93 of the battery 9 faces each other in the left-right direction, and are oriented in parallel to the side plate portions 74A and 74B of the receiving portion 7. The side plate portions 74A and 74B of the receiving portion 7 face the third side surfaces 93A and 93B, respectively. The pawl portion 742A (FIG. 9) of the holding pawl 741A and the pawl portion 742B of the holding pawl 741B are engaged, from above, with a rear end portion of the second side surface 92B, the rear end portion being closer to the first side surface 91B than a front end portion of the second side surface 92B is to the first side surface 91B. Each of pair of first side surfaces 91 of the battery 9 is perpendicular to the sloping direction D11. The first side surface 91A is positioned adjacent to the second plate portion 72 and the third plate portion 73. The first side plate 91B is exposed to the outside through the opening portion 23.

As described above, the battery 9 in the charging posture attached to the receiving portion 7 is supported by the protruding portions 71A and 71B, and the holding pawls 741A and 741B of the holding portion 7A. Hence, the battery 9 can be held to the battery charger 1A in a state where the battery 9 is capable of being charged.

Figure 13:
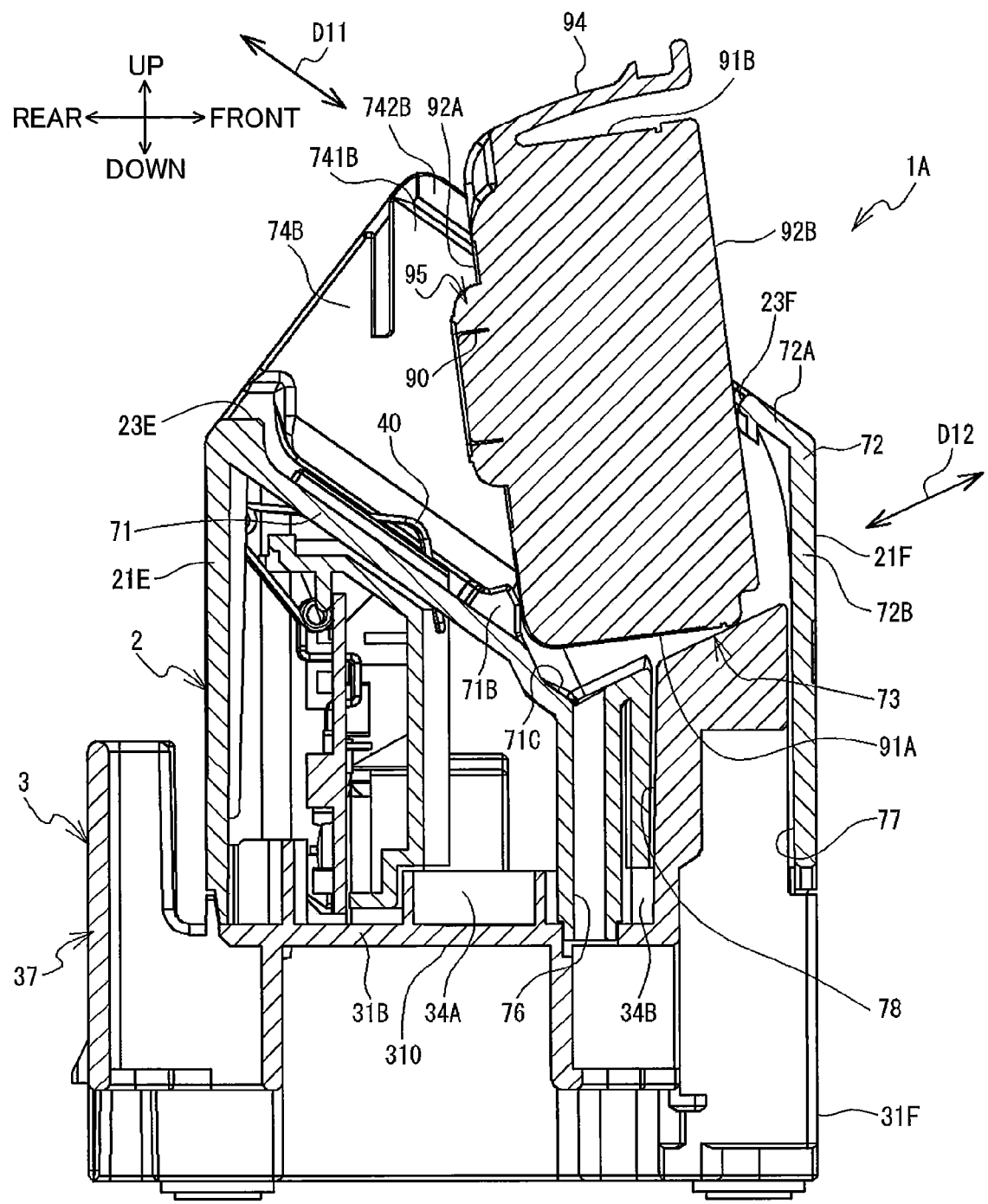
FIG. 13 is a cross-sectional view of the battery charger according to the embodiment and illustrating a state where the battery is held at its retracted posture.

The charging posture of the battery 9 (depicted in FIG. 11) can be changed to the retracted posture thereof (depicted in FIG. 13) by user's pivotally moving the battery 9 in a clockwise direction in a left side view. For example, the user picks the hand grip 94 with his fingers and pulls the battery 9 up to a near side for the user (i.e., diagonally frontward and upward in FIG. 11), so that the posture of the battery 9 can be changed from the charging posture (FIG. 11) to the retracted posture (FIG. 13). In the following description, unless otherwise specified, the pivoting direction (clockwise direction and counterclockwise direction) in relation to the battery 9 will be referenced assuming that the battery 9 is viewed from a left side thereof.

Figure 12:
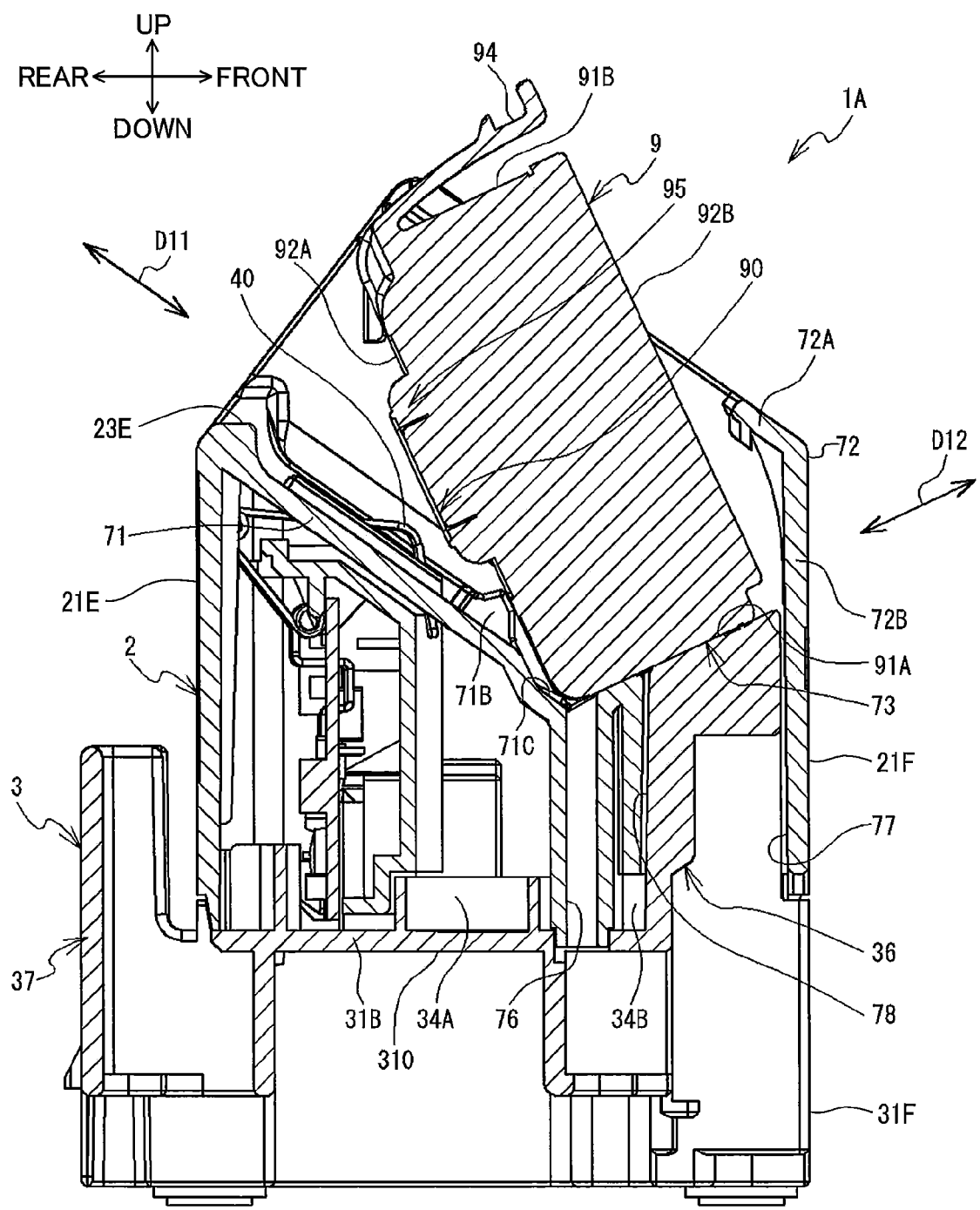
FIG. 12 is a cross-sectional view of the battery charger according to the embodiment and illustrating movement of the battery between its charging posture and retracted posture.

FIG. 12 illustrates a half way state during the change in posture of the battery 9 from the charging posture toward the retracted posture. The battery 9 at its charging posture is pivotally moved clockwise about the protruding portions 71A and 71B serving as a fulcrum. The holding pawls 741A and 741B of the receiving portion 7 are resiliently deformed outward in the left-right direction, so that the pawl portions 742A and 742B (FIGS. 1 and 9) are disengaged from the second side surface 92B of the battery 9. A corner portion between the first side surface 91A and the second side surface 92A of the battery 9 moves along the third plate portion 73 while being in sliding contact with the same of the receiving portion 7, and enters the recessed portion 71C, as depicted in FIG. 12.

As the battery 9 is further pivoted clockwise, the corner portion between the first side surface 91A and the second side surface 92A moves along a contour of the recessed portion 71C toward the protruding portions 71A and 71B. The second side surface 92A of the battery 9 moves upward from a position facing the first plate portion 71. The battery terminals 90 of the battery 9 are thus separated away from the charging terminals 40 of the receiving portion 7. The first side surface 91A of the battery 9 is moved to face the third plate portion 73 of the receiving portion 7. In this way, further pivotal movement of the battery 9 in the clockwise direction permits the battery 9 to assume the retracted posture (FIG. 13).

FIG. 13 illustrates the retracted posture of the battery 9 held by the battery charger 1A. In the retracted posture, the first side surfaces 91A and 91B are oriented in a direction generally perpendicular to the up-down direction, and are opposite each other generally in the up-down direction. The front end portion of the first side surface 91A is in abutment with the third plate portion 73, and the first side surface 91B is positioned above the opening portion 23.

The second side surfaces 92A and 92B are oriented in a direction generally perpendicular to the front-rear direction and are oppose each other generally in the front-rear direction. The lower end portion of the second side surface 92A is in abutment with the protruding portions 71A and 71B from a front side thereof. This abutment of the lower end portion of the second side surface 92A with the protruding portions 71A and 71B can restrain the battery 9 at its retracted posture from pivoting further in the clockwise direction. The battery terminals 90 of the battery 9 are positioned away from the charging terminals 40 of the receiving portion 7. The second side surface 92B is in abutment with the side 23F of the opening portion 23, i.e., the first part 72A of the second plate portion 72. The third side surfaces 93A and 93B are oriented perpendicular to the left-right direction, and are opposite each other in the left-right direction.

As described above, the battery 9 at its retracted posture and held in the receiving portion 7 is supported by the protruding portions 71A and 71B, the first part 72A of the second plate portion 72, and the third plate portion 73 of the holding portion 7A. Thus, the battery 9 can be held in the battery charger 1A with the retracted posture different from the charging posture (FIG. 11).

<Postures of the Battery Charger 1A for Use>

In a case where the battery charger 1A is used in the horizontal posture such that the battery charger 1A is placed on a horizontal plane such as on a desk, a gravitational direction is coincident with the downward direction of the battery charger 1A. In this case, the opening portion 23 of the battery charger 1A is open upward that is opposite to the gravitational direction, and the wall portion 31B (FIG. 5) of the second cover 3 faces the horizontal plane.

On the other hand, in a case where the battery charger 1A is used in the vertical posture such that the battery charger 1A is hooked to a vertical plane such as a wall, the gravitational direction is coincident with the frontward direction of the battery charger 1A. For example, at least one of the recessed portions 351 and 371 (FIG. 7) of the wall-latched portions 350 and 370 is hooked by a hook or hooks provided at the vertical plane, so that the battery charger 1A can be used in the vertical posture. In the vertical posture, the opening portion 23 is open upward which is opposite to the gravitational direction, and the wall portion 31B (FIG. 5) of the second cover 3 faces the vertical plane.

<Operations and Technical Advantages in the Embodiment>

The battery charger 1A according to the embodiment can perform charging to the battery 9 attached to the receiving portion 7 while holding the battery 9 in the charging posture. Therefore, charging to the battery 9 can be attained by user's attaching operation of the battery 9 to the receiving portion 7 of the battery charger 1A by way of moving the battery 9 along the first plate portion 71 of the receiving portion 7. Accordingly, the user's attaching operation of the battery 9 to the battery charger 1A can be facilitated.

Further, the battery charger 1A can also hold the battery 9 with its retracted posture where the battery terminals 90 are separated from the charging terminals 40. Hence, the battery 9 can be temporarily maintained at its retracted posture during a process of detaching the battery 9 from the battery charger 1A. Accordingly, the battery charger 1A of the embodiment can prevent the battery 9 from falling down from the receiving portion 7 during the detaching process of the battery 9 from the receiving portion 7.

The battery 9 attached to the receiving portion and held at the retracted posture is supported by the protruding portions 71A and 71B, the first part 72A of the second plate portion 72, and the third plate portion 73 of the holding portion 7A. That is, the battery 9 with its retracted posture can be held at multiple regions. Accordingly, the battery 9 can be stably maintained at its retracted posture.

Further, in the case where the battery 9 is attached to the receiving portion 7 and held at the retracted posture, a portion of the battery 9 including the first side surface 91B is exposed to the outside through the opening portion 23 of the receiving portion 7. With this structure, the user can easily access to the exposed portion of the battery 9, and hence, the user can easily detach the battery 9 from the battery charger 1A by pivotally moving the battery 9 to the retracted posture and holding the exposed portion of the battery 9.

Incidentally, in a case where the battery 9 is held at the retracted posture by the battery charger 1A at its vertical posture, the gravitational force is applied to the exposed portion of the battery 9, which may prompt the battery 9 to pivot in the clockwise direction. However, such a pivotal movement in the clockwise direction of the battery 9 at its retracted posture can be prevented by the abutment of the lower end portion of the second side surface 92A with the protruding portions 71A and 71B. Hence, in the case where the battery 9 is held to the battery charger 1A at its vertical posture and the battery 9 is held at the retracted posture, the protruding portions 71A and 71B can prevent the battery 9 from falling off from the receiving portion 7 due to the gravitational force. Accordingly, the battery charger 1A according to the embodiment can stably hold the battery 9 at its retracted posture regardless of the posture of the battery charger 1A, i.e., regardless of whether the battery charger 1A is at the horizontal posture or at the vertical posture.

The first plate portion 71 of the battery charger 1A has the recessed portion 71C at a position farther away from the opening portion 23 (side 23E) than the protruding portions 71A and 71B are from the opening portion 23 (side 23E) in the sloping direction D11. In the case where the battery 9 is pivotally moved from the charging posture toward the retracted posture, the corner portion between the first side surface 91A and the second side surface 92A moves along the contour of the recessed portion 71C toward the protruding portions 71A and 71B. In this way, the battery 9 can be smoothly moved between the charging posture and the retracted posture by permitting the part of the battery 9 to move in sliding contact with the recessed portion 71C. Accordingly, for example, the user can easily move the battery 9 from the charging posture to the retracted posture for detaching the battery 9 from the battery charger 1A.

The battery 9 attached to the receiving portion 7 and held at the charging posture is supported by the protruding portions 71A and 71B, and the holding pawls 741A, and 741B of the holding portion 7A. Therefore, the battery charger 1A can hold the battery 9 at its charging posture by the multiple regions, thereby stably maintaining the charging posture of the battery 9. Incidentally, in a case where the battery 9 is held at the charging posture relative to the battery charger 1A at the vertical posture, the portion of the battery 9 including the first side surface 91B is exposed to the outside through the opening portion 23, and the gravitational force is applied to the exposed portion of the battery 9 to urge the battery 9 to be pivotally moved in the clockwise direction.

However, the clockwise pivotal movement of the battery 9 can be prevented by the engagement of the second side surface 92B of the battery 9 with the pawl portions 742A and 742B of the holding pawls 741A and 741B. Hence, the holding pawls 741A and 741B can prevent the battery 9 from falling down from the receiving portion 7 due to the gravitational force applied to the battery 9 held at its charging posture to the battery charger 1A in the vertical posture. Accordingly, the battery charger 1A can stably hold the battery 9 at its charging posture regardless of the posture of the battery charger 1A, i.e., regardless of whether the battery charger 1A is at the horizontal posture or at the vertical posture.

<Variations and Modifications>

Various modifications are conceivable.

For example, in the retracted posture of the battery 9, the pawl portion 742A of the holding pawl 741A and the pawl portion 742B of the holding pawl 741B may be in abutment with an end portion of the second side surface 92A, the end portion being closer to the first side surface 91B than another end portion of the second side surface 92A is to the first side surface 91B. That is, the battery 9 attached to the receiving portion 7 and assuming the retracted posture may be supported by the protruding portions 71A and 71B, the first part 72A of the second plate portion 72, the third plate portion 73, and the pawl portions 742A and 742B of the holding portion 7A.

Further, the first part 72A of the second plate portion 72 may extend in a direction different from the extending direction (sloping direction D11) of the first plate portion 71. For example, the first part 72A may extend horizontally rearward from the upper end portion of the second part 72B.

Further, the sloping direction D11 may be perpendicular to the sloping direction D12.

Still further, a right end of the protruding portion 71A may be connected to a left end of the protruding portion 71B. That is, the protruding portions 71A and 72B may be formed as a single component extending in the left-right direction.

Still further, the recessed portion 71C may have a shape in conformance with a locus of the corner portion between the first side surface 91A and the second side surface 92A that may be formed by the pivotal movement of the battery 9 about the protruding portions 71A and 71B. Alternatively, the portion of the battery 9 may not contact the contour of the recessed portion 71C, but may be moved within a space of the recessed portion 71C while the battery 9 is moved between the charging posture and the retracted posture. Still further, the recessed portion 71C may not be formed in the first plate portion 71.

Further, a recessed portion may be formed in each of the third side surface 93A and 93B of the battery 9, such that the pawl portions 742A and 742B of the holding pawls 741A and 741B can be engaged with the recessed portions, respectively, when the battery 9 is at the charging posture. Further, an additional holding pawl may be provided at each of the side plate portions 74A and 74B for engagement with the first side surface 91B of the battery 9 at the charging posture. Further, the holding pawls 741A and 741B may not be provided at the respective side plate portions 74A and 74B.

While the description has been made in detail with reference to the embodiments thereof, it would be apparent to those skilled in the art that many modifications and variations may be made therein without departing from the scope of the disclosure.

REMARKS

The battery charger 1A is an example of a battery charger. The receiving portion 7 is an example of a receiving portion. The charging terminals 40 are an example of a charging terminal. The holding portion 7A is an example of a holding portion. The charging posture is an example of a first posture. The retracted posture is an example of a second posture. The opening portion 23 is an example of an opening portion. The side 23E is an example of a first side. The side 23F is an example of a second side. The first plate portion 71 is an example of a first plate portion. The second plate portion 72 is an example of a second plate portion. The first part 72A is an example of a first part of the second plate portion. The second part 72B is an example of a second part of the second plate portion. The third plate portion 73 is an example of a third plate portion. The recessed portion 71C is an example of a recessed portion. The side plate portions 74A and 74B are an example of side plate portions. The holding pawls 741A and 741B are an example of holding pawls. The battery 9 is an example of a battery. The first side surfaces 91A and 91B are an example of a pair of first side surfaces. The second side surfaces 92A and 92B are an example of a pair of second side surfaces. The third side surfaces 93A and 93B are an example of a pair of third side surfaces. The projection portion 95 is an example of a projection portion. The upward direction is an example of a first direction. The front-rear direction is an example of a second direction. The left-right direction is an example of a third direction. The sloping direction D11 is an example of a first sloping direction. The sloping direction D12 is an example of a second sloping direction. The housing 10 is an example of a housing. The first cover 2 is an example of a first member. The second cover 3 is an example of a second member. The wall surface 310 is an example of a surface of the second member.

What is claimed is:

1. A battery charger configured to charge a battery including a battery terminal, the battery charger comprising:
   a receiving portion in a form of a recess, the battery being attachable to and detachable from the receiving portion; and
   a charging terminal provided in the receiving portion;
   wherein the receiving portion comprises a holding portion configured to selectively hold the battery in the receiving portion at one of a first posture where the battery terminal is in contact with the charging terminal to allow the battery to be charged, and a second posture different from the first posture and where the battery terminal is separated from the charging terminal, wherein the receiving portion comprises,
    an opening portion which is an open end portion of the recess, the opening portion being defined by a first side and a second side opposing each other;
    a first plate portion at which the charging terminal is provided, the first plate portion extending from the first side and having an end portion opposite the first side;
    a second plate portion extending from the second side and having an end portion opposite the second side; and
    a third plate portion extending to connect the end portion of the first plate portion to the end portion of the second plate portion, wherein the battery is in contact with the first plate portion while being held at the first posture, and wherein the battery is in contact with each of the first plate portion, the second plate portion and the third plate portion while being held at the second posture.

2. The battery charger according to claim 1, wherein the opening portion is open in a first direction, the first side and the second side opposing each other in a second direction perpendicular to the first direction;

wherein the first plate portion extends from the first side and slopes in a first sloping direction sloping away from the opening portion in the first direction and toward the second side in the second direction, the first plate portion including a protruding portion protruding toward the opening portion, the charging terminal being provided at the first plate portion at a position closer to the opening portion than the protruding portion is to the opening portion, wherein the second plate portion comprises a first part and a second part, the first part extending from the second side and sloping in the first sloping direction, the second part extending from an end portion of the first part and extending in a direction opposite to the first direction, the end portion of the first part being opposite to the second side in the first sloping direction, wherein the third plate portion extends to connect the end portion of the first plate portion to the second part of the second plate portion, the third plate portion sloping in a second sloping direction crossing the first sloping direction, and wherein the holding portion comprises the protruding portion, the second plate portion, and the third plate portion.

3. The battery charger according to claim 2, wherein the battery has a rectangular parallelepiped shape configured of a pair of first side surfaces opposite each other, a pair of second side surfaces opposite each other, and a pair of third side surfaces opposite each other; and wherein, in a state where the battery is at the second posture, the battery is held by the holding portion such that:

the first side surfaces oppose each other in the first direction, the second side surfaces oppose each other in the second direction, and the third side surfaces oppose each other in a third direction perpendicular to the first direction and the second direction;

one end portion of one of the second side surfaces is in abutment with the protruding portion, the one of the second side surfaces being closer to the first side than remaining one of the second side surfaces is to the first side in the second direction, the one end portion of the one of the second side surfaces being farther away from the opening portion than another end portion of the one of the second side surfaces is from the opening portion in the first direction;

one end portion of one of the first side surfaces is in abutment with the third plate portion, the one of the first side surfaces being closer to the third plate portion than remaining one of the first side surfaces is to the third plate portion in the first direction, the one end portion of the one of the first side surfaces being closer to the second part than another end portion of the one of the first side surfaces is to the second part in the second direction; and the remaining one of the second side surfaces is in abutment with the first part of the second plate portion.

4. The battery charger according to claim 3, wherein the first plate portion has a recessed portion that is recessed in the direction opposite to the first direction, the recessed portion being positioned farther away from the opening portion than the protruding portion is from the opening portion;

wherein the third plate portion is connected to one end portion in the first sloping direction of the recessed portion, the one end portion of the recessed portion being farther away from the first side than another end portion of the recessed portion is from the first side in the first sloping direction.

5. The battery charger according to claim 3, wherein the receiving portion further comprises a pair of side plate portions opposite each other in the third direction;

wherein the holding portion further comprises a pair of holding pawls each provided at each of the side plate portions, the holding pawls being resiliently deformable in the third direction;

wherein the battery comprises a projection portion provided on the one of the second side surfaces; and wherein, in a state where the battery is at the first posture, the battery is held at the holding portion such that:

the first side surfaces are oriented in a direction perpendicular to the first sloping direction;

the second side surfaces are oriented in parallel to the first plate portion and the first part of the second plate portion, the one of the second side surfaces facing the first plate portion;

the third side surfaces are oriented in parallel to the side plate portions;

the projection portion of the battery is in abutment with the protruding portion; and the holding pawls are in engagement with the remaining one of the second side surfaces.

6. The battery charger according to claim 2, further comprising a housing defining the receiving portion, the housing comprising:

a first member defining the opening portion and including the first plate portion and the second plate portion, the first member further including a sloped portion sloping in the second sloping direction; and a second member assembled to the first member, the second member having a sloped portion sloping in the second sloping direction, the sloped portion of the first member and the sloped portion of the second member constituting the third plate portion of the receiving portion.

7. The battery charger according to claim 6, wherein the second member has a surface facing in the direction opposite to the first direction and positioned opposite to the opening portion in the first direction; and wherein the sloped portion of the first member and the sloped portion of the second member define a gap therebetween, the gap being in communication with a passage whose end in the direction opposite to the first direction is open on the surface of the second member.

8. The battery charger according to claim 6, wherein the second member has a surface facing in the direction opposite to the first direction and positioned opposite to the opening portion in the first direction; and wherein the first member is formed with a through-hole at a position where the first plate portion and the third plate portion are connected to each other, the through-hole being in communication with a passage whose end in the direction opposite to the first direction is open on the surface of the second member.

9. The battery charger according to claim 6, wherein the first plate portion is formed with a slot penetrating therethrough in the first direction; and wherein the charging terminal is supported by the second member to protrude into the receiving portion through the slot.

10. A battery charger configured to charge a battery including a battery terminal, the battery charger comprising:

a receiving portion in a form of a recess, the battery being attachable to and detachable from the receiving portion; and a charging terminal provided in the receiving portion, wherein the receiving portion comprises a holding portion configured to selectively hold the battery in the receiving portion at one of a first posture where the battery terminal is in contact with the charging terminal to allow the battery to be charged, and a second posture different from the first posture and where the battery terminal is separated from the charging terminal, wherein the receiving portion comprises, an opening portion which is an open end portion of the recess, the opening portion being defined by a first side and a second side opposing each other;

a first plate portion at which the charging terminal is provided, the first plate portion extending from the first side and having an end portion opposite the first side;

a second plate portion extending from the second side and having an end portion opposite the second side; and a third plate portion extending to connect the end portion of the first plate portion to the end portion of the second plate portion, wherein the battery has a first surface and a second surface opposite each other, the battery terminal being provided at the first surface, wherein a part of the second plate portion faces a portion of the second surface of the battery while the battery is held at the first posture, and wherein the part of the second plate portion is in contact with the second surface of the battery while the battery is held at the second posture.

* * * * *